US006655832B2

(12) United States Patent
Bach et al.

(10) Patent No.: US 6,655,832 B2
(45) Date of Patent: Dec. 2, 2003

(54) STRUCTURAL COMPONENT MADE OF HARD MATERIAL FOR A WRISTWATCH

(75) Inventors: Michael Bach, Biel (CH); Christophe Guerry, Le Locle (CH); Olivier Bucher, Morteau (FR)

(73) Assignees: Montres Rado SA, Lengnau (CH); Comadur S.A., Le Locle (CH)

( * ) Notice: Subject to any disclaimer, the term of this patent is extended or adjusted under 35 U.S.C. 154(b) by 0 days.

(21) Appl. No.: 10/227,455

(22) Filed: Aug. 26, 2002

(65) Prior Publication Data

US 2003/0002393 A1 Jan. 2, 2003

Related U.S. Application Data

(62) Division of application No. 09/314,950, filed on May 20, 1999, now Pat. No. 6,502,982.

(30) Foreign Application Priority Data

Jun. 5, 1998 (CH) ............................................. 1224/98

(51) Int. Cl.[7] ......................... G04B 37/00; F16G 13/06; A44C 5/02

(52) U.S. Cl. ............................... 368/282; 59/78; 59/84; 63/4

(58) Field of Search .......................... 368/88, 276, 280, 368/281, 282; 59/78, 80, 84, 90; 63/3, 4, 5.1, 21

(56) References Cited

U.S. PATENT DOCUMENTS

| | | | | |
|---|---|---|---|---|
| 4,327,429 A | | 4/1982 | Klingenberg | |
| 4,440,534 A | | 4/1984 | LaBate | |
| 4,521,356 A | | 6/1985 | Keller et al. | |
| 4,979,156 A | | 12/1990 | Kester | |
| 5,233,574 A | | 8/1993 | Walder et al. | |
| 5,347,498 A | * | 9/1994 | Loth et al. | 368/282 |
| 5,365,753 A | * | 11/1994 | Carrola | 63/4 |
| 5,438,858 A | | 8/1995 | Friedrichs | |

FOREIGN PATENT DOCUMENTS

| | | | |
|---|---|---|---|
| CH | 622 151 | A3 | 3/1981 |
| DE | 41 20 166 | A1 | 1/1993 |
| EP | 0 516 164 | A1 | 12/1992 |
| EP | 0520 224 | A1 | 12/1992 |

* cited by examiner

*Primary Examiner*—Vit Miska
(74) *Attorney, Agent, or Firm*—Griffin & Szipl, P.C.

(57) ABSTRACT

A structural component made of hard material for a wristwatch, characterised in that it includes a hole fitted with an inner threading which is integral with said component, said threading being directly obtained by injection and thus without removing any material of said component for example by machining.

4 Claims, 1 Drawing Sheet

STRUCTURAL COMPONENT MADE OF HARD MATERIAL FOR A WRISTWATCH

This application is a divisional application of U.S. patent application Ser No. 09/314,950, filed May 20, 1999, which claims priority of Swiss Application No. 1224/98, filed Jun. 5, 1998, now U.S. Pat. No. 6,502,982.

The present invention concerns a structural component made of hard material for a wristwatch and in particular a middle part for a watch case, a winding crown or bracelet links made of a material having a Vickers hardness greater than or equal to 1100 HV.

Metals are very widely used to make external parts for wristwatches because of their very advantageous properties: high mechanical resistance, high level of tenacity, ease of use and machinability, etc. Their hardness is however less than that of ceramics, and experience has shown that external parts for wristwatches have poor resistance to scratches caused by certain very hard agents such as silicon dioxide found in dust, marble or even such. There thus results a relatively rapid deterioration in the aesthetic appearance of these types of parts.

In order to avoid these drawbacks, these external parts are currently made of hard metal, for example tungsten carbide, titanium carbonitride or even ceramics.

These materials are however difficult to shape and in particular difficult to machine by means of conventional machining techniques, which constitutes a significant limitation during manufacturing of external parts for the watchmaking industry or jewellery parts whose often complex shapes make the manufacturing cost thereof high.

In particular, the assembly of various external parts made of materials of this type, such as for example the assembly of the middle part and the back cover or of the winding crown on its stem, presents significant difficulties.

Swiss Patent No. 622 151 discloses an example of an assembly structure of a back cover to a middle part of a watch case made of corundum. The middle part includes a plurality of recesses obtained for example by ultrasonic machining, grinding or electroerosion. These recesses have a flat base and a slightly truncated lateral face and open into the lower face of the middle part. Threaded plugs are glued in the recesses of the middle part. Screws pass through the openings in the back cover and engage in the plugs into which they are screwed. This assembly technique is also used for making ceramic winding crowns.

This assembly technique has however numerous drawbacks.

It is very difficult to control the quantity of glue when it is applied into the recesses, given the relatively small gluing surface onto which the plugs are glued.

Moreover, it is well known that the film of glue deteriorate quite rapidly over time. This proves particularly inconvenient in the case of a plug glued into the recess of a ceramic winding crown onto which traction efforts are regularly exerted.

Further, the implementation of this assembly technique is all the more delicate the smaller the dimensions. In order to provide an indication, the diameters of the plugs used are of the order of a few millimeters.

The main object of the present invention is thus to overcome the drawbacks of the aforementioned prior art, by providing a structural component made of hard material for a wristwatch allowing assembly with other structural components of the same type, which is reliable, simple and economical to implement.

The invention therefore concerns a structural component made of hard material for a wristwatch, characterised in that it includes a hole whose cylindrical wall includes a threading which is integral with said component.

As a result of this new structure, the assembly can easily be achieved by screwing directly into the body of said structural component, which gives it improved reliability. Indeed, thanks to this structural component, it is possible to form an assembly with another component including a positive strong mechanical connection which, in particular, does not involve the phenomenon of adhesion.

Other features and advantages of the present invention will appear in the following description of a preferred embodiment, given by way of non limiting example with reference to the annexed drawings, in which.

Figure 1:
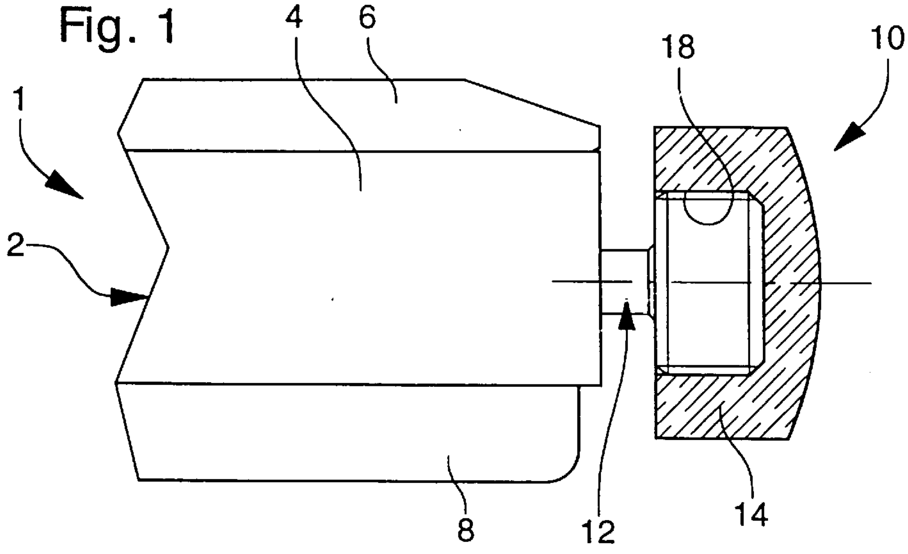
FIG. 1 is a partial schematic cross-section of a wristwatch fitted with a structural component according to the invention, in particular a winding crown.

Wristwatch 1, shown schematically and partially in FIG. 1, includes a case 2 formed conventionally of a middle part 4, a crystal 6 and a back cover 8. Watch 1 further includes timesetting means 10 co-operating in a known manner with a clockwork movement housed in case 2.

Means 10 include in particular a winding stem 12 topped with a winding crown 14.

Crown 14, which forms a structural component of wristwatch 1, is made of a hard material, i.e. a material having a Vickers hardness greater than or equal to 1100. By way of example, crown 14 can be made of a "hard metal", "metal-ceramic" or ceramic material. "Hard metal" means two phase composite materials formed of a metal phase which covers hard particles such as tungsten carbide particles or the like. "Metal-ceramic" means two phase composite materials formed of a metal phase which covers hard particles such as titanium carbonitride or the like.

According to the invention, crown 14 (FIG. 2) includes a hole 16 whose cylindrical wall includes an inner threading 18 which is integral with crown 14 and via which the latter is directly screwed onto winding stem 12. "A threading integral with a part" means that threading 18 is obtained without removing material by machining using any tool.

In order to provide an indication, the diameter of crown 14 is comprised between around 2 and 5 mm and the diameter of threaded hole 16 is comprised between around 2 and 3 mm, the length of threading 18 is comprised between around 1 and 2.5 mm, the manufacturing tolerances of such wristwatch parts being of the order of 2 to 3 hundredths of a millimeter.

During comparative tests effected by the Applicant, it was observed that crowns 14 according to the invention resist traction forces considerably higher than crowns with threaded plugs glued in conformity with the prior art.

Typically, the direct mechanical connection between winding stem 12 and crown 14 resists traction forces of the order of 800 N (breakage of winding stem 12) and more, whatever the environmental conditions whereas the glued mechanical connection between a plug and a crown resists, on average, traction forces of the order of 70 to 100 N in normal conditions, and decreases to 26 N in tropical climatic conditions.

It will be noted that, if required, a film of glue can be applied onto the threading of stem 12 or crown 14 to block crown 14 on winding stem 12.

An example of a method for manufacturing a structural component such as ceramic crown 14, will be described hereinafter. One takes first of all a ceramic powder, for example a stabilised zirconium oxide. The powder used has a mean granular size of the order of the micrometer, typically 0.5–1 micrometer.

The ceramic powder is then mixed with a binding agent, for example a polyvinylic alcohol. The mixture obtained is homogenised and dried, for example in a conventional atomiser. The granule obtained is sieved, typically to 300 micrometers. The sieved granule is then injected into a mould having the shape of the desired crown in order to form a green body of the latter. The mould includes in particular a core having the shape of a cylindrical stem in which helicoid grooves have been made to leave a thread in relief whose external shape corresponds to that of the desired threaded hole. The mould and the core are of course sized to take account of the shrinkage phenomenon which the crown will undergo during the subsequent sintering step. It will be noted in this regard that the dimensions are typically 20 to 25% greater than the final dimensions of the crown. After the injection step, the core is unscrewed then the crown is removed from the mould. The binding agent is then removed by a conventional heat process. After removal of the binding agent, the crown is placed in a sintering furnace in which it is heated at between 1300° C. and 1600° C. for approximately one hour. The crown is removed from the furnace and cooled. The crown is then polished, for example using a diamond paste, so that it has attractive aesthetic aspect.

The crown thus obtained may be directly screwed onto a winding stem having a suitable threading.

Figure 2:
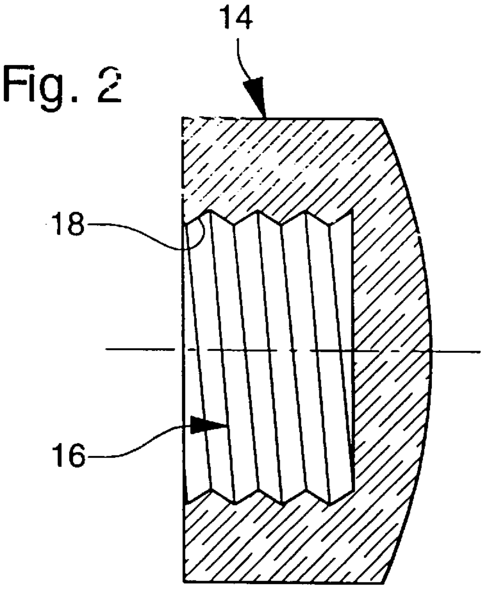
FIG. 2 is a cross-section of the winding crown shown in FIG. 1.
Figure 3:
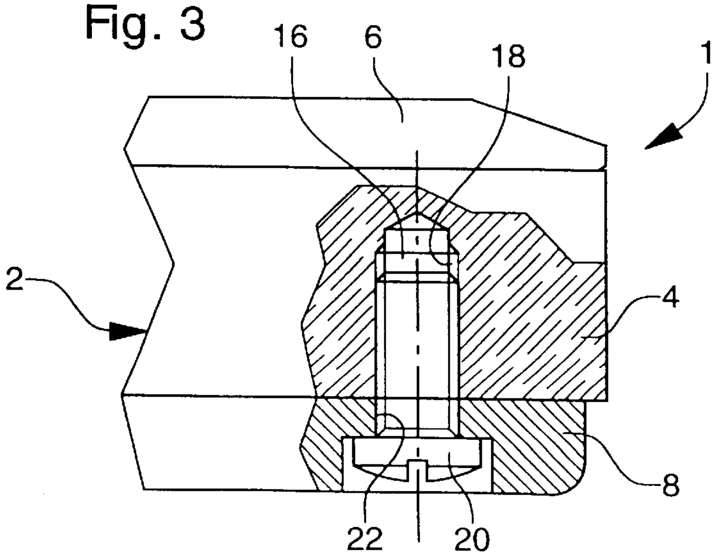
FIG. 3 is a partial schematic cross-section of a wristwatch fitted with another structural component according to the invention, in particular a middle part of a watch case.

FIG. 3 shows a wristwatch fitted with another structural component according to the invention and wherein the same components as those of FIGS. 1 and 2 bear the same numerical references. In this example, the structural component is formed by middle part 6 which is made of ceramic material. Middle part 6 includes, according to the invention, several holes 16 whose cylindrical wall includes an inner threading 18 which is integral with the body of middle part 6. These holes 16 open out into the lower face of middle part 6 and directly accommodate screws 20 which pass through openings 22 in back cover 8 to fix the latter to middle part 6.

In order to provide an indication, in the case of holes 16 for fixing screws 20 of middle part 6, the threaded diameter thereof is comprised between around 2 and 3 mm, and the length of the threading is comprised between around 2.5 and 5 mm.

What is claimed is:

1. A structural component made of hard material for a wristwatch, including a hole whose cylindrical wall includes a threading which is integral with said component, wherein said threading is obtained without removing material, and wherein said structural component is a bracelet.

2. A structural component according to claim 1, wherein said hard material has a hardness of greater than or equal to 1100 Vickers.

3. A structural component according to claim 2, wherein said hard material comprises a ceramic.

4. A structural component according to claim 3, wherein said threading is integral with said component as formed by molding.

* * * * *